United States Patent Office 3,213,013
Patented Oct. 19, 1965

3,213,013
REGULATING A HYDROCRACKING PROCESS, WITH A CRYSTALLINE ZEOLITE CATALYST, CONTAINING A PLATINUM GROUP METAL, TO OBTAIN A CONSTANT OCTANE GASOLINE
William Floyd Arey, Jr., Baton Rouge, La., assignor to Esso Research and Engineering Company, a corporation of Delaware
No Drawing. Filed July 25, 1962, Ser. No. 212,490
17 Claims. (Cl. 208—111)

The present invention deals with improved means of obtaining high octane product by means of hydrocracking petroleum fractions. More particularly it deals with a hydrocracking process employing a platinum group metal composited with a base exchanged crystalline zeolite wherein relatively high constant temperatures can be maintained during the reaction, particularly at its startup, as well as constant conversion levels and feed rates, with a consequent improvement in the nature of the product obtained as well as the over-all operation of the process.

It is well known in the art that various hydrocarbon fractions can be upgraded by subjecting them to hydrocracking conditions in the presence of either a fixed or fluid bed, etc., of a catalytic material. The feed hydrocarbons undergo both cracking and hydrogenation to give good yields of gasoline possessing superior engine cleanliness characteristics. The hydrocracking reaction is extremely exothermic and means must be provided for removing heat from the reaction zone. Conventionally, this is done by either insertion of a cooler within the catalytic reaction bed or by means of injection of a cold gas such as hydrogen periodically into the reaction zone. Conventional commercial hydrocracking units are, of necessity, designed to operate at essentially constant feed and product rates, and conversion is controlled by constantly but gradually increasing reactor temperature to maintain constant conversion. In other words, the decline in catalyst activity is compensated for by increasing the temperature.

It has recently been suggested to employ as a hydrocracking catalyst a platinum group metal deposited on, or composited with a crystalline alumino-silicate zeolite having an effective pore diameter of 6 to 15 Angstroms and which has been base exchanged with various cations, particularly hydrogen-containing cations, to reduce the $Na_2O$ content to less than 10 wt. percent based on zeolite. These catalysts show uniquely high activity.

When hydrocracking with very active catalysts based on crystalline zeolites, the octane number of the product obtained is greatly effected by the reaction temperature, the varying of the reaction temperature results in a varying octane number product during the course of the conversion cycle. This catalyst uniquely gives improved octane with higher temperatures although it would be expected that the product octane would be decreased due to the greater degree of hydrogenation encouraged at the higher temperatures. However, initial operation is normally at a very low temperature, since the fresh catalyst is very active and the reaction extremely exothermic. Thus, initially, the product will be of a relatively low octane number which increases as the temperature of the reactor is gradually raised day by day.

This procedure has several important drawbacks. First, because of a varying temperature of reaction a product of constant quality is not continuously being produced from the hydrocracking reactor. On the other hand, maintaining a constant temperature is not desirable because during the initial stages of hydrocracking with relatively fresh catalyst, overcracking of the feed constituents is taking place, while during the latter phases of the operation, undercracking is taking place. If one wishes to maintain high hydrocracking temperatures initially in order to maximize the octane improvement in the product, excessive cracking to gas products; e.g., methane, ethane, etc., takes place. Thus, there exists in the art a demand for means for maintaining a constant high octane product while operating at constant feed rate, constant conversion, and constantly high temperature with highly active crystalline alumino-silicate catalysts.

In accordance with the present invention, these desirable results are realized. More particularly, a selected reversible catalyst poison is employed at relatively high concentrations in the initial stages of the hydrocracking reaction, which are allowed to occur at high temperatures. The catalyst poison inhibits the excessive cracking tendencies of the fresh catalyst and thus allows high temperatures with consequent high octane products to be feasible. While a relatively large amount of catalyst poison is used while the catalyst is fresh and highly active, as the hydrocracking reaction continues and the catalyst ages and loses activity, the amount of the poison is reduced in order to maintain constant conversion at the relatively constant high temperature level and feed rate. By operating in this manner, substantially constant conditions insofar as conversion, feed rate, and reaction temperature can be employed to give a constant high octane number product. Thus, the over-all process can be conducted under constant designed conditions to produce a high octane product by gradual removal of poisons.

The catalyst poison is normally a nitrogeneous base material, preferably ammonia. Examples of other nitrogeneous bases which can be employed are amines, such as aryl amines, e.g., aniline; alkyl amines, e.g., methyl, propyl; ethylamaines, etc. Other compounds, which can be used, include nitrobenzene, nitrosobenzene, oximes, pyrrol, pyrrolidine, quinoline, etc. Alternatively to the use of nitrogeneous base materials carbon monoxide can be employed as the catalyst poison in the present process.

The greatest percentage of catalyst poison is employed in the initial stages of the hydrocarbon cracking reaction when the catalyst is fresh. The catalyst poison is gradually thereafter reduced in concentration. Initially the catalyst poison will be present in amounts of at least 100 p.p.m. based on weight of hydrocarbon feed to the hydrocracking reactor. Normally, initial concentration of poison, e.g., ammonia, will be greater than 1000 and may be as high as 10,000 p.p.m. nitrogen because of the high initial activity of the catalyst. However, after about 4 days of operation the concentration will be in the range of about 100 to 1000 p.p.m. based on hydrocarbon feed, depending upon the nitrogen content of the oil feed itself. The poison may be applied in various ways. For example, it may be incorporated in the hydrocarbon feed to the reaction zone, or added to the recycle gas to the process. It may additionally be impregnated on the original fresh catalyst sent to the reactor. In all events, the amount of catalyst poison; e.g., ammonia or nitrogeneous base, is gradually reduced during the course of the reaction as the catalyst becomes less active. However, at the same time relatively constant conditions of high temperature, conversion level and product quality characterize the hydrocracking reaction.

The present invention is clearly to be distinguished from the normal build-up of nitrogen-containing materials in a hydrocracking reactor treating a nitrogen-containing feed. In the normal treatment of nitrogen-containing feeds, the concentration of nitrogen is at its low point at the beginning of the reaction with the consequent build-up of nitrogen-containing components in the recycle gas occurring as the reaction proceeds (and as the catalyst activity decreases). The opposite relationship is characteristic of the present invention. Moreover, the present invention is distinguished from a process such as described in U.S. Patent 2,935,464. In such prior art processes, it has been suggested to add nitrogeneous bases to a hydroforming reaction which has been treating for a long period of time a high sulfur feed. The addition of the ammonia, well after the initial portions of the hydroforming reaction, was indicated to improve product selectivity by suppressing hydrocracking. In accordance with the present invention, the ammonia is introduced in the very initial portions of the hydrocracking reaction as means of enabling hydrocracking to take place at high temperatures in the presence of fresh catalyst. The amount of ammonia is thereafter reduced as the reaction continues. Additionally, the present invention is clearly distinguished from such prior art processes since it deals with hydrocracking rather than hydroforming, uses entirely different catalysts, and seeks to maintain a constant but improved quality of product throughout the entire course of the reaction zone.

Furthermore, the present invention is distinguished from a process such as described in U.S. Patent 3,023,159 which discloses the control of hydrocracking conversion by adding or removing nitrogeneous compounds to the feed. Whereas patentees indicate that such a method of control has the benefit of reducing hydrogen consumption and/or improving centane index, variation of nitrogen present when employing the crystalline zeolite catalyst of the present invention has no effect on either of these characteristics. Rather, the present invention, using crystalline zeolitic catalysts as opposed to the amorphous gel catalysts of U.S. Patent 3,023,159, and constant conditions of high temperature, conversion level and feed rate, yields gasoline of improved quality by utilizing the unique ability of this catalyst to give improved octane at higher temperatures.

Hydrocracking, per se, is well known in the art. Generally, it involves the cracking of distillates boiling from 300° F. upwards in the presence of hydrogen and a hydrocracking catalyst. Reaction temperatures are 500 to 800° F., pressures 300 to 500 p.s.i. with about 2 to 20,000 s.c.f. of hydrogen being passed to the reaction zone per barrel of feed. Preferred feed fractions boil in the range of 400–900° F., such as virgin and coker gas oils, cycle oils, heating oils, and similar materials derived from catalytic cracking. There is a net consumption of about 500 to 3000 s.c.f. of hydrogen per barrel of feed, depending upon the aromatic and olefin content of the feed. Feed throughputs generally range from 0.5 to 5 v./v./hr. In accordance with the present invention, relatively high (and constant) temperatures can be employed throughout the hydrocracking reaction. Preferred conditions for the practice of the present invention involve temperatures of about 660 to 730° F., pressures of 500 to 3000 p.s.i., conversion levels of 35 to 85, especially about 60% (to lighter products than feed), and hydrogen throughputs of 4 to 10 s.c.f. per barrel of feed.

The feed hydrocarbons are contacted with catalyst in the hydrocracking zone. Thus, being simultaneously cracked and hydrogenated to give distillate products of improved octane number, the effluent from the hydrocracking reactor is then sent to a fractionator normally operating under pressure from which hydrogen and light hydrocarbons such as methane are withdrawn overhead. The hydrogen is then recycled to the reaction zone. Generally, some of this recycle gas stream is purged in order to remove undesirable light hydrocarbons, such as methane, and fresh hydrogen added in order to preserve a hydrogen purity in the recycle stream of about 50 to 95+%.

As noted previously, the present catalyst poison, e.g., ammonia, may be added initially in large quantities to this recycle hydrogen stream with the concentration of catalyst poison gradually being decreased during the course of the hydrocracking reaction. Ammonia is the preferred catalyst poison since the catalyst activity readily responds to its addition and removal and its concentration in the recycle gas or reactor can conveniently be controlled by its addition or removal from the system.

In one embodiment of the present invention, the concentration of ammonia is gradualy reduced by passing the recycle gas through a water scrubber operating at a temperature of 50 to 150° F. and a pressure of 500 to 3000 p.s.i.g. whereby at least a portion of the ammonia present in the hydrocracking reaction is removed. Alternatively, the concentration of the catalyst poison may gradually be reduced by subjecting at least a portion of the recycle gas stream to contact with a solid absorbent such as alumina, silica, or 5 A. or 13 A. sodium alumino-silicate zeolites (molecular sieves) in an adsorption stage. Other methods for controlling the concentration of catalyst poison in the hydrocracking reaction zone include scrubbing with acidic liquids or contacting with ion-exchange resins.

The hydrocracking catalysts employed in the process of the present invention comprises a hydrogenation component on a large pore crystalline zeolitic support. Particularly preferred are zeolite crystalline alumino-silicate molecular sieves containing platinum group metals and characterized in that they have been treated to contain no more than 10% sodium calculated as $Na_2O$. Such large pore molecular sieves; e.g., 6 to 15 A. pore openings, are known in the art and generally referred to as "type 13" molecular sieves. A naturally occurring example thereof is faujasite. Natural or synthetic mordenite or the hydrogen form of mordenite are also large pore zeolites. As described in detail in U.S. Patent 2,971,904, a highly active catalyst can be prepared from such metallo-alumino-silicates having uniform large pore openings and being characterized by their crystalline nature. After forming the crystalline alumino-silicate zeolite, normally in its sodium form, it is treated so as to reduce its sodium content to less than 10%. This may be done by cationic exchange with various salts of metals which have no detrimental effect on the hydrocracking reaction, e.g., cobalt, nickel, zinc, cadmium, copper, or alkaline earths, or alternatively, by exchange with a hydrogen containing cation, e.g., an ammonium containing material to give the ammonium derivative which is then dried and calcined to decompose the ammonium anion to give what has been termed the hydrogen form of the sieve. In either case, the exchanged alumino-silicate sieve is then treated with a platinum group metal, e.g., platinum, palladium, etc., in order that the sieve catalysts have a substantial portion, e.g., 0.01 to 10 wt. percent of platinum group metal based on total composition. The preferred catalyst is an 0.2 to 5.0 wt. percent palladium on the hydrogen-form of alumino-silicate zeolite having a silica/alumina ratio above 4.

The various aspects and modifications of the present invention will be made more clearly apparent by reference to the following descriptions and accompanying examples.

EXAMPLE I

The effect of temperature on octane number of hydrocarbon distillates subjected to hydrocracking by the use of crystalline alumino-silicate large pore catalyst is illustrated by the following data. A light catalytic cycle oil boiling in the range of 430 to 610° F., having an API gravity of 29.3 and analyzing 40 p.p.m. nitrogen was subjected to hydrocracking at a constant conversion level of 60%. The temperature varied as indicated in Table I, the conversion being controlled by feed rate. In each run the pressure of the reactor was maintained at 1500 p.s.i.g. and 10,000 s.c.f. of hydrogen gas was utilized in the reactor per barrel of feed. The reactor contained a fixed bed of crystalline alumino-silicate catalyst containing 0.5 wt. percent palladium on a decationized (hydrogen-form) type 13 zeolite. The catalyst was prepared by exchanging an alumino-silicate molecular sieve having a silica to alumina ratio of about 5 with an aqueous solution of an ammonium salt such as the chloride or hydroxide at a temperature of about 150° F. so as to replace sufficient sodium ion to give a residual sodium oxide content of about 2.0 to 4.0%. The ammonium form of sieve was then contacted with an ammoniacal solution containing the desired amount of palladium in the form of palladium chloride. After about half an hour of exchange at ambient temperature, it was washed and dried. The sieve catalyst is then converted into the hydrogen form by heating at about 750° F. to give a 0.5 wt. percent palladium impregnated on what has been termed H-form of 13-Y molecular sieve.

The effect of temperature on the research octane number of various fractions formed by hydrocracking the feed cycle oil is illustrated in the following data of Table I.

*Table I*

| Reaction temperature | Research octane number (+3 cc. TEL) of naphtha product | | |
|---|---|---|---|
| | $C_5/180°$ F. naphtha | 180/375° F. naphtha | 375/430° F. naphtha |
| 650° F | 96 | 89 | 86 |
| 670° F | (96.3) | 93 | 92 |
| 690° F | (96.7) | 95.5 | 95 |
| 710° F | 97 | 98 | 98 |

As shown in the above data, high temperatures are desirable in the hydrocracking with such crystalline alumino-silicate catalysts since they give a product of higher octane number. However, such temperatures are normally not feasible with fresh catalyst since excessive cracking to light gases substantially reduces the gasoline yields attainable.

EXAMPLE II

The effect of nitrogeneous base concentration on the activity of the above-described palladium molecular sieve catalyst is illustrated by the following data. The data were obtained by introducing nitrogen compounds into the reactor with the feed and the recycle gas. The reactor was run under the same conditions as described in Example I, only the temperature required for a 60% conversion at 1 v./v./hr. feed rate was determined. The same light catalytic cycle oil feed of Example I which contains 40 p.p.m. based on weight of hydrocarbon of nitrogen in the form of nitrogen compounds in the feed constituents was employed. The nitrogen content was varied by adding several different nitrogen containing compounds to the light catalytic cycle oil. The nitrogeneous compounds tested were pyrrole and quinoline which are aromatic in nature and butylamine which, under reaction conditions, is readily decomposed to ammonia and thus simulates the addition of ammonia to the reactor feed. These three materials gave substantially the same results. The results are also similar to those obtained by running oils from different sources but of similar properties except for nitrogen content.

*Table II*

Total nitrogen added to reactor (nitrogen compounds in feed and recycle gas expressed as p.p.m. nitrogen on oil feed): Temperature required for 60% conversion at 1 v./v./hr. feed rate, ° F.

| | |
|---|---|
| 40 (feed nitrogen content only) | 650 |
| 125 | 670 |
| 350 | 690 |
| 650 | 710 |

As shown in Table II, without the practice of the present invention temperatures of 650° F. are required in order to maintain a conversion level of 60%. Thus, the advantages obtainable by the use of higher temperatures (illustrated in Example I) are not feasible. However, when nitrogeneous compounds are employed as a catalyst poison in accordance with the present process, the same constant conversion level could be realized while operating at substantially higher temperatures with substantially better product being obtained; i.e., higher octane number. Thus, the data illustrate the advantages to be secured by the addition of extraneous catalyst poison during the initial stages of the reaction when the catalyst activity is high as a means of allowing relatively high constant temperature to be employed so as to give high octane product.

EXAMPLE III

Example II was repeated with the exception that carbon monoxide was employed as the catalyst poison. The same catalytic cycle oil feed was processed under the same conditions as previously described and the temperature required for 60% conversion at 1 v./v./hr. of feed determined under conditions wherein (a) no carbon monoxide was present in the reaction zone, and (b) 3 mol. percent of carbon monoxide based on recycle gas was employed (7 wt. percent of carbon monoxide based on weight of hydrocarbon feed). The results are tabulated as follows.

*Table III*

CO (in hydrogen recycle gas): Temperature required for 60% conversion at 1 v./v./hr., ° F.

| | |
|---|---|
| None | 650 |
| 3 mol. percent of recycle gas | 725 |

As shown above, the presence of a substantial amount of carbon monoxide in the hydrocarbon reaction zone allowed substantially higher temperatures to be employed during the conversion and thus consequent benefit in higher octane number product was obtainable.

EXAMPLE IV

A method frequently employed for lowering the nitrogen content of various oils is to destroy the nitrogeneous compounds by hydrotreating. Consequently, the effect of the nitrogen content of the feed was determined by hydrotreating a portion of the light catalytic cycle oil and then hydrocracking the low nitrogen content oil. The results were then compared with those obtained by hydrocracking the untreated, higher nitrogen content catalytic cycle oil to the same conversion level, but at a higher temperature.

The hydrotreating for nitrogen removal was carried out using a fixed bed of cobalt molybdate-alumina catalyst at 650° F. and 1500 p.s.i.g. using a feed rate of 1 v./v./hr. and a hydrogen rate of 1000 s.c.f. per barrel of oil feed. The product oil analyzed 2 p.p.m. nitrogen and, because of the simultaneous hydrogenation of the aromatic and olefinic hydrocarbons in the feed, had a slightly lower (about 10° F.) average boiling point and a gravity of 32.8° API versus 29.3° API for the feed.

The effect of lowering nitrogen content (by hydrotreating) on hydrocracking over a palladium-crystalline alumino-silicate catalyst such as described in Example I is shown by the following data for runs made at both 800 p.s.i.g. and 1500 p.s.i.g. operating pressure. These tests were made after several hundred hours of operation, so that the catalyst had already undergone its normal initial activity decline and was of relatively constant activity.

Table IV

| Feed | Light catalytic cycle oil | | | |
|---|---|---|---|---|
| Pretreat | Hydrotreated | None | Hydrotreated | None |
| N, p.p.m. | 2 | 40 | 2 | 40 |
| Hydrocracking conditions: | | | | |
| Pressure, p.s.i.g. | 800 | 800 | 1,500 | 1,500 |
| Recycle gas, s.c.f./b. | 8,000 | 8,000 | 6,000 | 6,000 |
| Feed rate, v./v./hr. | 1.3 | 1.3 | 3.9 | 3.9 |
| Temperature, °F. | 646 | 706 | 650 | 710 |
| Conversion to 430° F.−, vol. percent | 65 | 66 | 48 | 46 |
| Hydrogen Consumption,* c.f./b. fed | 1,600 | 1,600 | 1,400 | 1,400 |
| $C_3^-$ Gas make, wt. percent | 4 | 4 | 3 | 3 |
| $C_4$/430° F. naphtha yield vol. percent | 72 | 75 | 54 | 53 |
| Octane number of naphtha fractions, research leaded (3 cc.): | | | | |
| 180/375° F. | 93.0 | 97.5 | 93.7 | 96.6 |
| 375/430° F. | 92.1 | 97.4 | 94.8 | 97.9 |
| Cetane index of 430° F.+ fuel | 62 | 62 | 56 | 56 |

\* Total consumption of hydrogen, including that consumed in feed hydrotreating.

These data show that removal of nitrogeneous components from the feed makes the feed more easily converted. Thus, at constant feed rate, the higher nitrogen content feed can be hydrocracked at a higher temperature without adversely affecting the dry gas and naphtha yields to give a naphtha product having the improved octane number associated with the use of a platinum group metal-crystalline alumino-silicate zeolite and higher operating temperature.

The data also show that the hydrogen consumption for hydrocracking the nitrogen containing feed is the same as experienced in the combination hydrotreating followed by hydrocracking the low nitrogen hydrotreated oil. In addition, the feed nitrogen level is shown to have no effect on the quality of the 430° F.+ fuel oil as measured by cetane index when employing a large pore crystalline alumino-silicate catalyst. This is in contrast to the disclosure of U.S. Patent 3,023,159.

EXAMPLE V

In this example a light catalytic cycle oil similar to that used in the previous examples, but from a different source and differing in having a higher boiling range of 450/650° F. was employed. About 0.9 wt. percent quinoline was added to this feed so that it analyzed 1000 parts per million of nitrogen. Hydrocracking of this feed using the same type of crystalline alumino-silicate catalyst employed in the other examples resulted in the following comparison.

Table V

| Feed | Catalytic cycle oil | Catalytic cycle oil plus quinoline |
|---|---|---|
| N, p.p.m. | 40 | 1,000 |
| Hydrocracking conditions: | | |
| Pressure, p.s.i.g. | 1,500 | 1,500 |
| $H_2$ Rate, c.f./b. | 8,000 | 8,000 |
| V./v./hr. | 1 | 0.5 |
| Temperature, °F. | 640 | 710 |
| Vol. percent conversion to 430° F. and lighter | 64 | 57 |
| Hydrogen consumption (adjusted to 60% conversion) | 1,590 | 1,590 |
| Octane number of naphtha fractions, research leaded (3 cc. TEL): | | |
| $C_5$/180° F. | 94.9 | 97.6 |
| 180/375° F. | 87.0 | 92.6 |
| 375/430° F. | 87.3 | 94.0 |

These data show the increased octane number obtained by operating at a higher temperature using added nitrogeneous compounds to prevent overcracking. Also, in this case of adding nitrogen compounds to the feed, there was no effect on hydrogen consumption or cetane index of the 430°F.+ fuel.

EXAMPLE VI

As further illustrating the practice of the present invention, the following specific embodiment is set forth.

A 430 to 600° F. boiling gas oil is subjected to hydrocracking at a temperature of 710° F., pressure of 1500 p.s.i., using a space velocity of 1.8 v./v./hr. and 8,000 s.c.f. of hydrogen per barrel of feed. The gas oil contains a small quantity of nitrogen compounds and analyzed 40 p.p.m. nitrogen. The gas oil is contacted with a fresh 0.5 wt. percent palladium on the H-form of type 13 molecular sieve of high silica/alumina ratio (such as described previously). The molecular sieve contained 2.0 wt. percent of sodium oxide. The reactor is operated at 710° F. to give a product having a leaded (3 cc. TEL) research octane number of about 97.

Because of the very high activity of fresh catalyst the initial ammonia concentration is very high. Ammonia is added to the recycle gas initially introduced into the reaction zone so as to have an initial concentration of about 8,000 p.p.m. of nitrogen based on hydrocarbon feed. As the catalyst has a high initial rate of activity decline, the ammonia concentration is rapidly reduced during the first portion of the run. For instance, it is continually reduced from the initial 8,000 p.p.m. of nitrogen to 4,000 during the first 20 hours, to 3000 by the 40th hour, to 2,000 by the 60th hour, to 1000 by the end of the fifth day and to 160 p.p.m. by the tenth day of operation. This and the subsequent decrease in the nitrogen content of the reactor is obtained by adsorbing a portion of the ammonia from the hydrogen recycle gas by means of a water wash zone operating at about 100° F. and 1500 p.s.i.g. After reaching the 160 p.p.m. nitrogen level, the nitrogen content of the reactor is reduced at a slower rate. The reduction is about 10 p.p.m. per day until a level of about 80 p.p.m. is reached and then at a lower rate of about one-half p.p.m. per day until it reaches a level of 40 p.p.m. which is the nitrogen content of the oil feed. At this time, substantially all of the ammonia is being removed from the recycle gas. The catalyst can now operate in the absence of added poison at the constant high temperature of 710° F. without yield loss due to over-cracking.

Thus, by operating in this manner a constant feed throughput of oil is hydrocracked at a constant conversion level of about 60% while employing a substantially high reactor temperature of 710° F., thus obtaining a product having a higher octane number than obtained by maintaining the conversion at a constant level by changes in the temperature alone.

Having described the present invention, that which is sought to be protected is set forth in the following claims.

What is claimed is:

1. In the hydrocracking of hydrocarbon fractions boiling above 300° F. by contact at a hydrocracking temperature of 500 to 800° F. with a hydrocracking catalyst comprising a crystalline alumino-silicate zeolite having uniform pore openings of 6 to 15 Angstroms and containing a catalytic amount of a platinum group metal and less than 10 wt. percent $Na_2O$, said catalyst having an initial hydrocracking activity which in the absence of a catalyst poison produces excessive cracking to undesired products at the desired hydrocracking temperature within said temperature range, the improved means for obtaining high quality product of relatively constant octane number at a relatively constant conversion level, hydrocarbon feed rate and hydrocracking temperature which comprises (1) initially conducting the hydrocracking reaction at said desired temperature in the presence of a relatively high concentration of catalyst poison sufficient to temporarily suppress said initial activity to thereby prevent said excessive cracking to undesired products, and (2) thereafter reducing the concentration of said catalyst poison in proportion to the loss of catalyst activity as the catalyst ages during said hydrocracking reaction while (3) maintaining the hydrocarbon feed rate, conversion level, reaction temperature, and product octane number substantially constant.

2. The improvement of claim 1, wherein said catalyst poison is selected from the group consisting of nitrogenous bases and carbon monoxide.

3. The improvement of claim 1, wherein said catalyst poison is ammonia.

4. The improvement of claim 1, wherein said zeolite has been exchanged with a hydrogen-containing cation.

5. The improvement of claim 1, wherein said hydrocracking temperature is within the range of 660 to 730° F.

6. The improvement of claim 1, wherein said poison is ammonia, and wherein said initial relatively high concentration is at least 100 p.p.m. based on hydrocarbon feed.

7. The improvement of claim 1, wherein said catalyst comprises palladium deposited on the hydrogen form of said zeolite.

8. The improvement of claim 1, wherein said hydrocarbon fractions boil in the range of 400 to 900° F.

9. In the hydrocracking of hydrocarbon fractions boiling in the range of 400 to 900° F. by contact at a hydrocracking temperature of 660 to 730° F. with a hydrocracking catalyst comprising a crystalline alumino-silicate zeolite having uniform pore openings of 6 to 15 Angstroms and containing a catalytic amount of a platinum group metal and less than 10 wt. percent $Na_2O$, said catalyst having an initial hydrocracking activity which in the absence of ammonia produces excessive cracking to undesired products at the desired hydrocracking temperature within said temperature range, the improved means for obtaining high quality product of relatively constant octane number at a relatively constant conversion level, hydrocarbon feed rate and hydrocracking temperature which comprises (1) initially conducting the hydrocracking reaction at said desired temperature in the presence of a relatively high concentration of ammonia sufficient to temporarily suppress said initial activity to thereby prevent said excessive cracking to undesired products, and (2) thereafter reducing the concentration of said ammonia in proportion to the loss of catalyst activity as the catalyst ages during said hydrocracking reaction while (3) maintaining the hydrocarbon feed rate, conversion level, reaction temperature, and product octane number substantially constant.

10. An improved hydrocracking process for producing high quality product of relatively constant octane number which comprises (1) contacting a hydrocarbon fraction boiling in the range of 400 to 900° F. with a hydrocracking catalyst comprising a crystalline alumino-silicate zeolite having uniform pore openings of 6 to 15 Angstroms and containing a catalytic amount of a platinum group metal and less than 10 wt. percent of $Na_2O$, said catalyst being further characterized by an initial hydrocracking activity which in the absence of a catalyst poison produces excessive cracking to undesired products at the desired hydrocracking temperature; (2) carrying out said hydrocracking process at an essentially constant temperature within the range of 660 to 730° F. and at an essentially constant conversion rate of feed to lower boiling products within the range of 35 to 85%; (3) maintaining a sufficient concentration within the range of about 1,000 to 10,000 parts per million of catalyst poison during the early stages of the hydrocracking reaction to temporarily suppress said initial activity and thereby prevent said excessive cracking, said poison being selected from the group consisting of nitrogenous bases and carbon monoxide; and (4) thereafter gradually reducing the concentration of said catalyst poison in proportion to the loss of catalyst activity as the catalyst ages during said hydrocracking process while maintaining essentially constant reaction conditions and product octane number throughout said process.

11. The process of claim 10, wherein the catalyst contains 0.01 to 10 wt. percent of a platinum group metal and the silica to alumina ratio of said zeolite is above 4.

12. The process of claim 10, wherein the conversion of hydrocarbon feed to lower boiling products is maintained constant at about 60%.

13. The process of claim 10, wherein the catalyst poison comprises a nitrogenous base compound.

14. The process of claim 10, wherein the catalyst poison comprises ammonia.

15. An improved hydrocracking process for producing high quality product of relatively constant octane number which comprises (1) contacting a hydrocarbon fraction boiling in the range of 400 to 900° F. with a hydrocracking catalyst comprising a crystalline alumino-silicate zeolite having uniform pore openings of 6 to 15 Angstroms and containing a catalytic amount of a platinum group metal and less than 10 wt. percent of $Na_2O$, said catalyst being further characterized by an initial hydrocracking activity which in the absence of a catalyst poison produces excessive cracking to undesired products at the desired hydrocracking temperature; (2) carrying out said hydrocracking process at an essentially constant temperature within the range of 660 to 730° F. and at an essentially constant conversion rate of feed to lower boiling products of about 60%; preventing said excessive cracking to undesired products by (3) maintaining a sufficient concentration of within the range of about 1,000 to 10,000 parts per million of catalyst poison during the early stages of the hydrocracking reaction to temporarily suppress said initial activity and thereby prevent said excessive cracking, said poison comprising a nitrogenous base compound; and (4) thereafter gradually reducing the concentration of said catalyst poison in proportion to the loss of catalyst activity as the catalyst ages during said hydrocracking process while maintaining essentially constant reaction conditions and product octane number throughout said process.

16. The process of claim 15, wherein the nitrogenous compound comprises ammonia.

17. The process of claim 15, wherein the initial concentration of nitrogenous compound in the reaction zone is about 1,000 to 10,000 parts per million and after about 4 days is reduced to about 1,000 parts per million.

References Cited by the Examiner

UNITED STATES PATENTS

| 2,971,904 | 2/61 | Gladrow | 208—135 |
| 2,983,670 | 5/61 | Seubold | 208—111 |
| 3,023,159 | 2/62 | Ciapetta et al. | 208—111 |
| 3,048,536 | 8/62 | Coonradt et al. | 208—112 |
| 3,119,763 | 6/64 | Haas et al. | 208—109 |

ALPHONSO D. SULLIVAN, *Primary Examiner.*